United States Patent
Wittkowski et al.

(10) Patent No.: US 6,562,779 B2
(45) Date of Patent: May 13, 2003

(54) PREPARATION OF EMULSIFIABLE ETHYLENE POLYMERS

(75) Inventors: Lars Wittkowski, Mannheim (DE); Andreas Deckers, Flomborn (DE); Wilhelm Weber, Neustadt (DE); Stefan Weiss, Neckargemünd (DE); Michael Ehle, Ludwigshafen (DE); Siegfried Gast, Ludwigshafen (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/782,308

(22) Filed: Feb. 14, 2001

(65) Prior Publication Data

US 2001/0025021 A1 Sep. 27, 2001

(30) Foreign Application Priority Data

Feb. 25, 2000 (DE) .......................... 100 08 931

(51) Int. Cl.$^7$ .............. C11D 7/26; C11D 7/32; C11D 7/40; C08F 8/00
(52) U.S. Cl. ............ 510/476; 510/245; 510/268; 510/214; 510/417; 510/505; 526/212; 526/318.6; 526/89; 526/194; 526/204; 526/208; 526/209; 526/213; 526/217; 526/220; 526/222
(58) Field of Search ................. 510/245, 268, 510/214, 417, 475, 476, 505; 526/212, 318.6, 89, 194, 204, 208, 209, 213, 217, 220, 222

(56) References Cited

U.S. PATENT DOCUMENTS

| | | | |
|---|---|---|---|
| 3,132,120 A | 5/1964 | Graham et al. | 260/78 |
| 4,122,248 A | 10/1978 | Pfelger et al. | 528/481 |
| 4,351,931 A * | 9/1982 | Armitage | 526/227 |
| 4,417,035 A | 11/1983 | Oeder et al. | 526/208 |
| 5,360,881 A * | 11/1994 | Mallo et al. | 526/240 |
| 5,376,739 A | 12/1994 | Pfleger et al. | 526/64 |
| 5,384,373 A * | 1/1995 | McKinney et al. | 526/212 |
| 5,739,242 A | 4/1998 | Deckers et al. | 526/318 |

FOREIGN PATENT DOCUMENTS

| | | |
|---|---|---|
| DE | 1 770 777 | 12/1971 |
| DE | 25 24 274 | 12/1976 |
| DE | 29 37 239 | 3/1981 |
| DE | 43 34 846 | 4/1995 |
| EP | 053 668 | 6/1982 |
| EP | 713 887 | 5/1996 |
| GB | 1265173 | 3/1972 |
| GB | 2058795 | 4/1981 |

OTHER PUBLICATIONS

"Ulmann's Encyklopädie der Technischen Chemie" Band 24 pp. 1–49.

Buback et al. "Entwicklun eines kontiuierlich betriebenen Hochdruck–Hochtemperatur–Rührkessels mit Licht–Einkopplung" Chem–Ing. Tech vol. 66 (1994) pp. 510–513.

* cited by examiner

Primary Examiner—Gregory Delcotto
(74) Attorney, Agent, or Firm—Keil & Weinkauf

(57) ABSTRACT

Emulsifiable ethylene polymers comprising copolymers of from 90 to 95% by weight of ethylene, from 4 to 10% by weight of one or more $C_3$–$C_{12}$ alkenecarboxylic acids, and from 0 to 1.2% by weight of one or more tertiary esters of the corresponding $C_3$–$C_{12}$ alkenecarboxylic acids, where the wax has a cinematic melt viscosity of from 800 to 3000 mm$^2$/s, measured at 120° C.;

and a process for preparing the novel emulsifiable ethylene polymers, emulsions comprising the novel ethylene polymers, a process for preparing the emulsions from the novel ethylene polymers, and also floor cleaners, car cleaners, leather cleaners and stone cleaners, and coatings for surfaces made from wood, metal, paper, glass or from plastics, comprising aqueous emulsions of the novel emulsifable waxes.

17 Claims, No Drawings

PREPARATION OF EMULSIFIABLE ETHYLENE POLYMERS

The present invention relates to emulsifiable waxes, comprising copolymers of
from 90 to 95% by weight of ethylene,
from 4 to 10% by weight of one or more $C_3$–$C_{12}$ alkenecarboxylic acids, and
from 0 to 1.2% by weight of one or more tertiary esters of the corresponding $C_3$–$C_{12}$ alkenecarboxylic acids,
where the wax has a cinematic melt viscosity of from 800 to 3000 mm²/s, measured at 120° C.

The invention further relates to a process for preparing the novel emulsifiable ethylene polymers, to emulsions comprising the novel ethylene polymers, to a process for preparing the emulsions from the novel ethylene polymers, and also to floor cleaners, car cleaners, leather cleaners and stone cleaners, and to coatings for surfaces made from wood, metal, paper, glass or from plastics, comprising aqueous emulsions of the novel emulsifiable waxes.

Emulsifiable ethylene polymers are of great interest industrially, since they can be used as low-cost floor cleaners or processing aids, for example. Other applications are hot-melt adhesives, for metals, ceramics, wood, glass, leather or plastics, and also adhesion promoters for coatings made from polyolefins or from rubbers, and additives for paints. The emulsifiable ethylene polymers known industrially are oxygen-containing ethylene polymers in which the oxygen can be introduced in two different ways:

by free-radical or Ziegler-Natta polymerization of ethylene, followed by oxidation of the resultant polyethylene waxes by air or peroxides, or by pure oxygen, or by mixtures of the same, giving what are known as oxidate waxes, or by free-radical copolymerization of ethylene with acrylic acid or methacrylic acid or with hydrolyzable acrylates or with methacrylates, with malonates, or with vinyl carboxylates, such as vinyl acetate, under high-pressure conditions, again introducing oxygen functionalities into the polyethylene chain.

However, both processes have disadvantages industrially. The oxidation of a polyethylene reduces the molecular weight of the fundamental polyethylene chains, and this is disadvantageous for the hardness of the product. Finally, the production of oxidate waxes is always a two-stage process, requiring additional capital expenditure (cf. *Ullmann's Enyclopädie der technischen Chemie*, 4th edition, key words: Wachse, Vol. 24, pp. 36 et seq., Thieme Verlag Stuttgart, 1977, for example).

It is in fact possible to copolymerize ethylene directly with acrylic acid. However, the direct use of acrylic acid as comonomer in industrial plants is undesirable, since acrylic acid is corrosive in those sections of the plant disposed to mechanical stress, for example compressors, feed pipes and valves.

If an ester hydrolysis step has to be inserted after the polymerization in preparing a polyethylene wax, the result is a two-stage process with the associated disadvantages of high capital expenditure requirement.

DE-A 25 24 274 describes a process for preparing polymers made from ethylene and tert-butyl acrylate or tert-butyl methacrylate, polymerizing in a reactor and giving the resultant ethylene-tert-butyl acrylate-acrylic acid terpolymer a thermal post-treatment in a second reaction zone. The thermal post-treatment cleaves a certain percentage of the ester groups. The polymers known from the literature have very good film properties and provide good film material. However, the terpolymers prepared are unsuitable as waxes.

It is also known that tert-alkyl esters of acrylic acid or methacrylic acid can be copolymerized with ethylene by a free-radical route. These esters can be hydrolyzed under acid or alkaline conditions, and can also be cleaved thermally.

U.S. Pat. No. 3,132,120 describes the preparation of ethylene-tert-butyl methacrylate copolymers followed by thermolysis at from 275 to 350° C. in the absence of a substantial amount of oxygen. This is a two-stage process which requires high capital expenditure.

DE-A 43 34 846 describes a process for preparing carboxyl-containing copolymers of ethylene, featuring subsequent thermolytic cleavage of the ester groups of tertiary alcohols at from 150 to 250° C. in the presence of sulfonic acids. The process is characterized by the substantial absence of initiators for free-radical reactions. This, too, is a two-stage process.

DE-A 42 19 129 describes a procedure for the copolymerization of ethylene with n-butyl acrylate or tert-butyl acrylate in a tubular reactor which is operated at different temperatures in the different reaction zones. This procedure can give copolymers with good film properties, but not emulsifiable waxes.

DE-A 29 37 239 describes a process for preparing copolymers of ethylene by copolymerizing ethylene with esters of unsaturated carboxylic acids, and, in a second step reacting these at from 40 to 75° C. with compounds conventionally used for ester hydrolysis, in particular with concentrated $H_2SO_4$. This second step consumes time and needs high capital expenditure. In addition, contaminated solvents are produced, and are expensive to purify or dispose of.

Finally, DE-A 17 70 777 describes a process for preparing waxy copolymers of ethylene, in which ethylene, $C_3$–$C_{12}$ alkenecarboxylic acids, tert-alkyl esters of the relevant $C_3$–$C_{12}$ alkenecarboxylic acids, and also isobutene, are copolymerized by a free-radical route at from 110 to 350° C. and at pressures of from 100 to 4000 atm. A preferred embodiment mentioned is polymerization in a tubular reactor, and the temperature profiles are described in detail. However, the waxy copolymers obtainable by way of this teaching no longer meet the requirements of today's markets. For example, depending on the embodiment they comprise excessive proportions, i.e. more than 1% by weight, of uncleaved ester groups, making the waxes tacky. In another embodiment of DE-A 17 70 777, the proportions of acrylic acid copolymerized are too low, giving unsatisfactory emulsifiability. Finally, there are embodiments in which the viscosity, for example that determined by way of the cinematic viscosity, is too low, so that performance characteristics deteriorate. For example, floor cleaners produced using low-viscosity waxes lack adequate hardness. Lastly, performance testing shows that the copolymers obtainable by the process disclosed in DE-A 17 70 777 are chemically inhomogeneous. This inhomogeneity, caused for example by the differences in comonomer contents of the different polymer molecules, becomes noticeable in a relatively high speck count.

The wax obtainable as in DE-A 17 70 777 can be post-treated by prolonged heating, but this risks degradation of the polymer chains, or else crosslinking of the polymer. Crosslinked polymers in turn give a high speck count in performance tests. It would also be possible to ensure chemical homogeneity by, for example, feeding tert-butyl acrylate into the tubular reactor at a very large number of locations. However, the high pressures make this procedure disadvantageous for technical and cost reasons. Either numerous very high-performance pumps are required or severe pressure loss would have to be accepted.

It is an object of the present invention, therefore,
to provide emulsifiable waxes comprising ethylene-tert-butyl acrylate-acrylic acid copolymers which have a very low speck count, have adequate viscosity, are not tacky and can be prepared under cost-effective conditions,
to provide a process for preparing the desired waxes,
to prepare aqueous emulsions from the desired waxes, and
from the emulsions of the emulsifiable waxes to prepare floor cleaners, car cleaners, leather cleaners and stone cleaners, and also coatings for surfaces made from wood, metal, paper, glass or from plastics.

We have found that this object is achieved and that the novel emulsifiable waxes can be obtained by copolymerizing ethylene and one or more tertiary esters of one or more $C_3$–$C_{12}$ alkenecarboxylic acids, preferably tert-butyl acrylate, in a stirred high-pressure autoclave at an elevated temperature, thermally cleaving the ester group during this same step, and carrying out these operations at a substantially constant temperature. The temperature during the reaction here is identical across the entire reactor. No significant chronological or spatial temperature differences occur, and these are on average less than 5° C., preferably less than 3° C. The setting of a temperature profile, as in DE-A 42 19 129, is therefore dispensed with.

It is also important that from the very beginning of operations an elevated temperature is used. For the purposes of the present invention, an elevated temperature is from 240 to 340° C., preferably from 260 to 300° C. Higher temperatures can cause partial decomposition of monomers, or else crosslinking of the product, and this causes speck formation in performance testing. At lower temperatures there is insufficient cleavage of the tert-butyl groups.

The pressure conditions are less critical. Suitable pressures are from 1000 to 3500 bar, preferably from 1500 to 2500 bar. These pressures are standard conditions for high-pressure polymerization processes.

The stirred high-pressure autoclaves preferably employed for this process are known per se, and a description is found in Ullmann's Enyclopädie der technischen Chemie, 4th edition, keywords: Wachse, Vol. 24, pp. 36 et seq;, Thieme Verlag Stuttgart, 1977). Their length/diameter ratio is mainly from 5:1 to 30:1, preferably from 10:1 to 20:1.

The monomers used comprise ethylene, and also one or more tertiary esters of one or more $C_3$–$C_{12}$ alkenecarboxylic acids. If desired, other monomers copolymerizable under the reaction conditions may be added. 1-Olefins, such as propene or 1-butene, may be used here, as may isobutene.

Examples of suitable $C_3$–$C_{12}$ alkenecarboxylic acids are: acrylic acid, methacrylic acid, vinylacetic acid, crotonic acid, maleic acid and fumaric acid, preferably acrylic acid or methacrylic acid, particularly preferably acrylic acid.

Examples of suitable tertiary ester groups are: tert-butyl, tert-amyl or neophyl, and tert-butyl is particularly preferred.

The makeup of the comonomer feed may be varied within certain limits. It is generally from 1.5 to 8% by weight of a tertiary ester of a $C_3$–$C_{12}$ alkenecarboxylic acid or else of the mixture of corresponding esters. From 2 to 7% by weight are preferred, and from 2.5 to 6.7% by weight are particularly preferred. The balance of 100% by weight is given as ethylene.

The polymers may also contain small amounts of isobutene, of the order of 2% by weight. The isobutene is formed by thermolytic cleavage of tertiary butyl groups. However, determination by analysis is difficult, since the appropriate signals overlap strongly, both in the NMR measurements frequently used and in IR measurements. The copolymerized isobutene units are therefore usually ignored in analysis.

The values for the makeup of the comonomer feed are particularly useful if the overall conversion is set at from about 30 to 35%. If a lower conversion is to be realized, the percentages of tertiary ester which have to be fed are generally smaller.

The initiators used for the free-radical polymerization may comprise the usual free-radical initiators, such as organic peroxides, oxygen or azo compounds. Combinations of the abovementioned free-radical initiators are also suitable. Particularly suitable peroxides are di-tert-butyl peroxide, tert-butyl peroxypivalate, tert-butyl peroxyisononanoate and dibenzoyl peroxide, or mixtures of the same. An example of an azo compound is azobisisobutyronitrile (AIBN). The amounts of the free-radical initiators fed are those usual for polymerization.

Regulators usual for high-pressure polymerization may be added to the reaction mixture, for example alkanes, such as propane or isododecane, alkenes, such as propylene, aldehydes, such as propionaldehyde or benzaldehyde, or ketones, such as acetone or methyl isobutyl ketone.

The novel waxes can be obtained by the process described above. These novel waxes have the following features:

The melting points of the novel waxes are from 60 to 110° C., preferably from 80 to 105° C. Waxes with lower melting points are disadvantageous when used in floor cleaners or car cleaners, since they lack adequate mechanical stability when the temperature rises, for example in the summer. Waxes with higher melting points give markedly poorer emulsification.

The acid number determined DIN 53402, is from 30 to 110 mg KOH/g of wax, preferably from 30 to 65 mg KOH/g of wax and particularly preferably from 30 to 50 mg KOH/g of wax.

The proportion of unthermolyzed tertiary ester groups should be very low. The preferred lower limit is 0.3% by weight and particularly preferably 0.02% by weight. Cleavage of all of the ester groups requires a prolonged reaction time and is therefore rather unattractive economically. In addition, a prolonged reaction time can lead to increased thermal stress on the wax to be prepared and to degradation of the polymer chains or to crosslinking reactions.

The maximum proportion of unthermalized ester groups is 1.2% by weight, preferably 1% by weight and particularly preferably 0.5% by weight. Higher proportions make samples of wax tacky. The preferred method for determining the proportion of ester groups is NMR spectroscopy.

The proportion of acid units in the novel wax, particularly preferably of acrylic acid units, is at least 1.2% by weight, preferably at least 2% by weight and particularly preferably at least 4% by weight. Smaller proportions of acid units lead to poorer emulsifiability of the waxes. The slip resistance moreover of floor cleaners prepared using a novel wax is good only at more than 1.2% by weight of acid units.

On the other hand, the proportion of acid groups should not exceed 10% by weight, preferably 8.5% by weight, and particularly preferably 8% by weight, because the ester component from which the acid groups have been produced is markedly more expensive than ethylene.

The cinematic melt viscosity, measured at 120° C., of the novel waxes is from 800 to 3000 mm$^2$/s, preferably from 1000 to 2000 mm$^2$/s. Lower melt viscosities lead to unsatisfactory mechanical properties of the floors after cleaning. If the melt viscosities are too high it becomes impossible to emulsify the waxes satisfactorily.

The novel waxes may be emulsified by processes known per se. For this, the wax is melted in an autoclave and the following mixture, for example, is prepared:

from 10 to 80 parts by weight of the polymer of the invention, from 2 to 10 parts by weight of an emulsifier, ionic and nonionic surfactants being suitable and nonionic surfactants being preferred. Examples of commonly used nonionic emulsifiers are ethoxylated mono-, di- and trialkylphenols (EO number: from 3 to 50, alkyl: $C_4$–$C_{12}$) and also ethoxylated fatty alcohols (EO number: from 3 to 80, alkyl: $C_8$–$C_{36}$). Preferred examples of these are the Lutensol® grades from BASF AG, but other products, such as Triton® grades from Union Carbide, are also suitable, from 0.1 to 5 parts by weight, preferably from 0.5 to 1 part by weight, of an alkali metal hydroxide, preferably NaOH or KOH;

from 0.01 to 1 part by weight of an acid scavenger, sodium disulfite being particularly suitable, and from 20 to 200 parts by weight of water, preferably from 60 to 70 parts by weight.

Temperature and pressure conditions for preparing the novel emulsions are not critical per se. A wide range of temperatures may be used, preferably above the melting point of the novel wax to be emulsified. The pressure range from 1 to 10 bar is suitable. The mixing time after complete melting of the wax is usually from 2 minutes to one hour. Operations are generally carried out with stirring under inert conditions, i.e. under nitrogen.

The emulsions prepared according to the invention may be used in the following applications, which are given as examples: hot-melt adhesives, processing of thermoplastics (e.g. polyamide, impact-modified polystyrene, ABS or polypropylene), (water-based) surface coatings, two-layer metallic automotive paints, masterbatches (pigment concentrates for coloring polyolefins, for example), coating of metal surfaces, wood surfaces, paper, glass, or of plastics, or adhesives, impregnation of construction materials, floor protection, cleaners (e.g. leather or stone cleaning), car cleaners, floor cleaners, bottle coatings or mold release agents.

It is particularly preferable to use the novel emulsions in floor cleaners, in car cleaners, in leather cleaners and in stone cleaners, or else in coatings for surfaces made from wood, metal, paper, glass or from plastics.

The capacity of the novel emulsions to form colorless, clear glossy films can be utilized in floor cleaners. They can moreover improve the slip resistance and the usage qualities of floors.

A typical test floor cleaner is composed of from 10 to 20 parts by weight of the novel emulsions, which are responsible for elasticity, dirt-repellency and gloss of the floor to be cleaned, from 0.5 to 5 parts by weight, preferably from 2 to 3 parts by weight, of ethylene diglycol, from 0.1 to 10 parts by weight, preferably from 1 to 2 parts by weight, of ethylene glycol, from 0.1 to 10 parts by weight, preferably from 1 to 2 parts by weight, of a permanent plasticizer, trialkyl phosphates being examples of plasticizers used, particularly preferably tri(n-butoxyethyl) phosphate, from 0.1 to 5 parts by weight, preferably from 0.5 to 1.5 parts by weight, of a wetting and leveling agent, the wetting and leveling agents usually used being fluorinated surfactants, such as FC-129 from 3M, and, from 20 to 30 parts by weight of a dispersion made from polystyrene-acrylate as carrier. A preferred example is Poligen® MF750.

The test floor cleaner is prepared by mixing the components in a bucket, and it is generally sufficient if these are stirred together for 5 minutes.

EXAMPLES

1. Preparation of the polymers of the invention

Ethylene and tert-butyl acrylate (Examples 1 to 4) were polymerized in a high-pressure autoclave with the addition of 100 ml of propionaldehyde and 1500 ml of isododecane as molecular weight regulators (moderators). The high-pressure autoclave used for this is similar to the autoclave described in the literature (M. Buback et al., Chem. Ing. Tech. 1994, 66, 510). For the reaction, the monomer mixture, to which 0.08 mol/h of di-tert-butyl peroxide, 0.03 mol/h of tert-butyl peroxypivalate and 0.03 of mol/h of tert-butyl peroxyisononanoate had been added as initiator, was fed at the reaction pressure of 1700 bar. The temperature of the reaction mixture was constant at 300° C. The residence time was 2 minutes. Table 1 gives the polymerization conditions and the analytical data for the resultant polymers.

The content of ethylene, tert-butyl acrylate and acrylic acid in the polymers was determined by IR spectroscopy and NMR spectroscopy. The acid number of the polymers was determined by titration to DIN 53402.

2. Preparation of emulsions from the polymers of the invention

The emulsions based on the polymers of the invention were prepared by stirring the following components together in an autoclave at 120° C. and from 1.5 to 3 bar under nitrogen for 30 minutes:

| | |
|---|---|
| from 25–30 parts | of polymer (Examples 1 to 4, and also 1c to 3c), |
| from 5–7 parts | of emulsifier (nonionic surfactant selected from the group consisting of the grades Lutensol AO10, Lutensol TO8, Lutensol ON70 and Lutensol TO107) |
| from 0.5–1.0 part | of KOH, solid, |
| from 0.01–0.1 part | of sodium disulfite, and |
| from 60–70 parts | of water. |

All of the parts used were parts by weight. This is a typical framework formulation, and the components were varied within the limits given without any measurable differences in the performance test.

Table 2 gives the analytical data for the emulsions made from the polymers processed to the framework formulation given. The emulsions made from the polymers of the invention are homogeneous.

3. Performance tests on the emulsions made from the polymers of the invention

Floor cleaners were prepared from the emulsions made from the polymers of the invention using the following typical framework formulation, by stirring the components at room temperature in a bucket:

| | |
|---|---|
| from 50–60 parts | of water, |
| from 2–3 parts | of ethylene diglycol, |
| from 1–2 parts | of ethylene glycol, |
| from 1–2 parts | of tri(n-butoxyethyl) phosphate as permanent plasticizer, |
| from 0.5–1.5 parts | of the wetting and leveling agent FC-129 from 3M in a 1% strength solution, |
| from 20–30 parts | of Poligen ® MF750 polymer dispersion, and |
| from 10–20 parts | of emulsion made from the polymer of the invention in experiments 1 to 4 and, respectively, one of the comparative examples 1c to 3c. |

Again, the parts used are parts by weight.

After two applications of film to a PVC floor (brown, Mipolam®), the film properties of the wax-rich blends (floor cleaner formulation) prepared according to the framework formulation were measured. Table 2 gives properties of the floor cleaners.

TABLE 1

Synthesis and characterization for the copolymers 1–4 of the invention, and also for Comparative Experiments 1c–3c

| | Preparation of polymers | | | | Characterization of polymers | | | | | |
|---|---|---|---|---|---|---|---|---|---|---|
| | | | Monomer mixture in the feed | | Copolymer makeup/Acid No. (% by weight) | | | | Melting | Melt viscosity |
| | $T_{Reactor}$/ | Pressure/ | [% by weight] | | | | Acrylic | [mg | point | 120° C. |
| No. | ° C. | bar | Ethylene | TBA | Ethylene | TBA | acid | KOH/g] | [° C.] | [$mm^2 \cdot s^{-1}$] |
| 1 | 300 | 1700 | 99.4 | 0.6 | 95.6 | 0.5 | 3.9 | 32 | 86 | 1190 |
| 2 | 300 | 1700 | 99.0 | 1.0 | 93.7 | 0.8 | 5.5 | 41 | 83 | 1180 |
| 3 | 300 | 1700 | 98.9 | 1.1 | 93.2 | 0.4 | 6.4 | 47 | 78 | 1490 |
| 4 | 300 | 1700 | 98.5 | 1.5 | 91.9 | 0.5 | 7.6 | 60 | 74 | 1290 |
| 1c | 165–272 | 2200 | 94.8 | 5.2 | 98.7 | 0.1 | 1.2 | 9 | 101–103 | 590 |
| 2c | 165–259 | 2200 | 87.3 | 12.7 | 96.4 | 1.0 | 2.6 | 20 | 96–98 | 1080 |
| 3c | 165–244 | 2200 | 62.6 | 37.4 | 85.8 | 8.1 | 6.1 | 47 | 95–97 | 1250 |

1c to 3c correspond to repeats of experiments 3, 4 and 5 from DE-A 17 70 777.

TABLE 2

Analytical data for the emulsions and film properties of the resultant floor cleaners

| | Analytical data for emulsions | | | | Film properties | | | |
|---|---|---|---|---|---|---|---|---|
| No. | pH | Viscosity (4 mm)[2] | Viscosity (5 mm)[1] | LD[3] [%] | Gloss[4] | Leveling[5] | Water resistance[6] | Slip resistance[7] |
| 1 | 10.3 | n.d.[8] | 350.0 s | 26.2 | 57 | good | good | 0.43 |
| 2 | 9.8 | 350 s | 125.0 s | 62.9 | 58 | fairly good | good | 0.47 |
| 3 | 9.5 | 187 s | 73.5 s | 71.7 | 62 | good | good | 0.49 |
| 4 | 9.0 | 51.5 s | 23.0 s | 54.1 | 63 | good | good | 0.51 |
| 1c[9] | n.d. | — | — | — | — | — | — | — |
| 2c | 11.0 | n.d. | n.d. | 42.0 | 50 | fairly good | — | 0.25 |
| 3c | 9.5 | n.d. | n.d. | 64.2 | 58 | good | good | good |

Evaluation of comparative examples: the novel floor cleaners comprising the novel waxes were superior to Comparative Examples 1c and 2c when exposed to mechanical stress. 2c had inadequate slip resistance. 3c was tacky, and this is attributable to the excessive proportion of unthermalized ester.
[1]Conversion 1cSt = 1 $mm^2$/s
[2]Viscosity to DIN ISO 2431
[3]Light transmittance, 1:400/533 nm
[4]Gloss value: Average of 10 measurements (85° MK; UME 1 Universal measurement unit from Dr. Lange GmbH)
[5]Leveling: cross made in wet film
[6]Water resistance: filter paper test/droplet test
[7]Slip resistance: measured after 2 days (FSC 2000 Digital Floor Slide Control from Sellmaier); Scale: 0.01–1.00; 0.63–1.00 very safe, 0.42–0.63 safe, 0.29–0.42 fairly safe, 0.21–0.29 unsafe, 0.00–0.21 very unsafe
[8]not determined
[9]could not be emulsified

We claim:

1. An emulsifiable copolymer wax comprising
   from 90 to 95% by weight of ethylene,
   from 3.9 to 8.5% by weight of one or more $C_3$–$C_{12}$ alkenecarboxylic acids, and
   from 0.02 to 1.2% by weight of one or more tertiary esters of the corresponding $C_3$–$C_{12}$ alkenecarboxylic acids,
   and having a cinematic melt viscosity of from 800 to 3000 $mm^2$/s, measured at 120° C.

2. The emulsifiable copolymer wax defined in claim 1, wherein the alkenecarboxylic acid is acrylic acid, and the tertiary ester of the alkenecarboxylic acid is tert-butyl acrylate.

3. The emulsifiable copolymer wax defined in claim 1, comprising
   from 92 to 95% by weight of ethylene,
   from 3.9 to 8% by weight of acrylic acid, and
   from 0.02 to 0.5% by weight of tert-butyl acrylate,
   and having a cinematic melt viscosity of from 1000 to 2000 $mm^2$/s, measured at 120° C.

4. A process for preparing the emulsifiable copolymer wax defined in claim 1 by copolymerizing ethylene and tert-butyl acrylate at pressures of from 1000 to 3500 bar, which comprises using, for the polymerization, a temperature which is from 240 to 340° C. and does not vary by more than 5° C. during the course of the polymerization.

5. The process of claim 4, wherein the temperature varies by less than 3° C. during the polymerization.

6. An aqueous emulsion comprising the emulsifiable copolymer wax defined in claim 1.

7. A process for preparing the aqueous emulsion defined in claim 6, which comprises emulsifying the emulsifiable wax with water.

8. A floor cleaner comprising the aqueous emulsion defined in claim 6.

9. A car cleaner, leather cleaner or stone cleaner comprising the aqueous emulsion defined in claim 6.

10. A coating for surfaces made from wood, metal, paper, glass or from plastics, and comprising the aqueous emulsion defined in claim 6.

11. An emulsifiable copolymer wax consisting essentially of from 90 to 95% by weight of ethylene, from 3.9 to 8.5% by weight of one or more $C_3$–$C_{12}$ alkenecarboxylic acids, from 0.02 to 1.2% by weight of one or more tertiary esters of the corresponding $C_3$–$C_{12}$ alkenecarboxylic acids, and up to 2% by weight of isobutene, and having a cinematic melt viscosity of from 800 to 3000 mm$^2$/s, measured at 120° C.

12. The emulsifiable copolymer wax defined in claim 11, wherein the alkenecarboxylic acid is acrylic acid, and the tertiary ester of the alkenecarboxylic acid is tert-butyl acrylate.

13. A process for preparing the emulsifiable copolymer wax defined in claim 11 by copolymerizing ethylene and tert-butyl acrylate at pressures of from 1000 to 3500 bar, which comprises using, for the polymerization, a temperature which is from 240 to 340° C. and does not vary by more than 5° C. during the course of the polymerization.

14. An aqueous emulsion comprising the emulsifiable copolymer wax defined in claim 11.

15. A floor cleaner comprising the aqueous emulsion defined in claim 14.

16. A car cleaner, leather cleaner or stone cleaner comprising the aqueous emulsion defined in claim 14.

17. A coating for surfaces made from wood, metal, paper, glass or from plastics, and comprising the aqueous emulsion defined in claim 14.

* * * * *